May 7, 1929.  M. M. TITTERINGTON  1,711,507
CONTINUOUSLY INDICATING HYDROSTATIC GAUGE
Filed Oct. 21, 1924
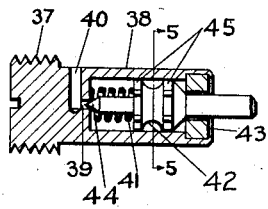
Fig. 4
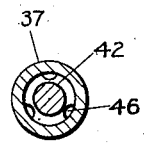
Fig. 5
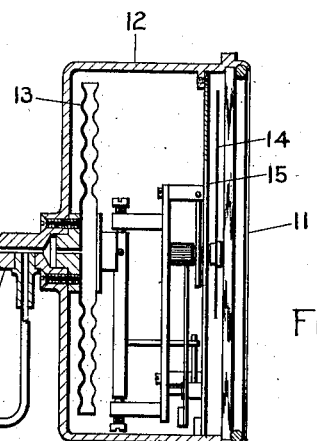
Fig. 1
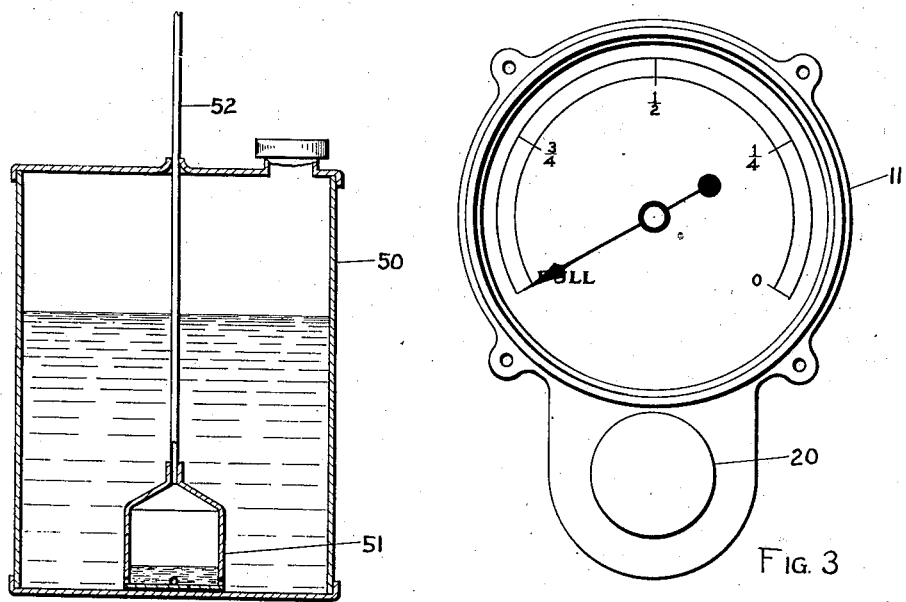
Fig. 2
Fig. 3
Inventor:
Morris M. Titterington Patented May 7, 1929.

1,711,507

UNITED STATES PATENT OFFICE.

MORRIS M. TITTERINGTON, OF BROOKLYN, NEW YORK, ASSIGNOR, BY MESNE ASSIGNMENTS, TO PIONEER INSTRUMENT COMPANY, INCORPORATED, OF BROOKLYN, NEW YORK, A CORPORATION OF NEW YORK.

CONTINUOUSLY-INDICATING HYDROSTATIC GAUGE.

Application filed October 21, 1924. Serial No. 744,950.

This invention relates to continuously indicating hydrostatic gauges of the type disclosed in my copending application Serial No. 743,927 filed October 16, 1924, and has for one of its objects the provision of improved means for regulating the injection of air into the gauge system. Further objects are to provide improved means for protecting the indicating mechanism from damage by the prevention of excessive pressures, and for effecting a positive seal between the air system and the air injection means when the latter is not being operated. Other objects and advantages will appear as the invention is hereinafter disclosed.

While practical embodiments of this invention are shown in the drawings and disclosed in these specifications, it will be understood that various modifications may be resorted to within the scope of the appended claims.

Referring to the drawings which illustrate what I now consider preferred forms of the invention:

Figure 1 represents an elevation, partly in section, of a gauge, pump and associated parts, Figure 2 is an elevation of the tank the level of the liquid in which is to be indicated, and Figure 3 shows a front view of the gauge and pump, Figure 4 represents one of the pressure control elements removed from the balance of the mechanism and shown on a larger scale for greater clearness.

Figure 5 is a section taken at 5—5 of Figure 4.

Referring to the drawings, the gauge 11 comprises a case 12, a flexible chamber 13, and means for transmitting movements of the flexible chamber to a hand 14 which moves relatively to a dial 15 for the purpose of giving indications. Associated with the gauge 11 is a pump 20. This pump comprises a barrel 21 which is closed at one end by a cap 22. Reciprocatively contained within the barrel 21 is a plunger 23 consisting of a flexible cup 24 which is held between retainers 25 and 26. Slidably passing through the center of the plunger 23 is a rod 27 to the outer end of which is attached a knob 28 and to the inner end of which is attached a screw 29. Between the retainer 26 and the cap 22 is a compression spring 30 which surrounds the rod 27.

At the rear of the barrel 21 a valve chamber 33 is located. From this valve chamber a tube 34 leads to a nipple 16 attached to the gauge case 12, thus forming a passage from the valve chamber 33 to the interior of the flexible chamber 13.

Within the valve chamber 33 is a pressure control unit or "valve capsule" 36 which is illustrated to a large scale in Figures 4 and 5. This capsule comprises a threaded plug 37 having a hollow cylindrical extension 38. A small hole 39 is provided in the center of the plug, and a radial hole 40 communicates from this to the exterior of the capsule. Within the hollow cylinder 38 is placed a small compression spring 41 and a compound valve 42 as shown. The spring and valve are retained by a ring 43 which is spun into the end of the hollow cylindrical extension 38. The edge of the hole 39 forms a circular seat into which fits a small valve pin 44 forming part of the compound valve 42. At the other end of the valve 42 is a cone which fits into the hole in ring 43. In the central part of the compound valve 42 are two disks 45. These disks have a dual function, acting as guides for the valve 42 and as pressure plates affected by flow of air along the axis of the valve 42. Certain portions 46 of these disks are cut away to reduce the resistance offered by the disks to passage of air past them. By suitably proportioning these cutout portions the resistance to flow may be given any desired value.

When the capsule 36 is screwed into the chamber 33 the outer edge of the cylindrical extension 38 seats into the chamber 33, and the outer end of the threaded plug 37 is sealed with shellac or other sealing material. The space around the cylindrical extension 38 therefore forms a tight connection from the passage 40 to the tube 34.

In the bottom of the tank 50, the level of the liquid in which is to be measured, is a chamber 51 which is connected by a tube 52 to the nipple 16 on the gauge case 12.

The operation of the system as a simple hydrostatic gauge is as follows, assuming that the entire system is initially full of air: As liquid is poured into the tank 50 it rises in chamber 51 and compresses the air contained in the system in accordance with the hydrostatic head of the liquid. This pressure is therefore transmitted to the gauge and the latter may be calibrated so that it will indicate the level of the liquid in inches, gallons, pounds or other function of pressure head as may be desired.

If the maintenance of a constant amount of air in the system could be assured, the gauge would continue to indicate the level of the liquid correctly at all times. However, experience has shown that various factors contribute to make it difficult or impossible to maintain the air in the system without auxiliary means. Changes in temperature, changes in pressure, minute leaks and other factors tend to reduce the amount of air in the system and to thereby reduce the indication of the gauge and to render it undependable as a quantative indicator of the liquid level.

In accordance with the present invention, means are provided for replenishing the air in the system to compensate for losses due to the factors which have been recited. The operation of the air replenishing mechanism is generally similar in principle to that disclosed in my copending application in that, by means of the pump 20, air is forced into the system. Novel means are provided for limiting the pressure and rate of flow of the air entering the system, and for preventing flow back from the system to the air injecting means.

The pump is operated by manually pulling out the rod 27 by means of the knob 28. This pulls back the plunger 23 against the spring 30. On this stroke the flexible cup 24 permits flow of air around its periphery. When the knob 28 is released the spring 30 returns the plunger 23 and rod 27 to their original positions. On this stroke the flexible cup 24 expands against the wall of the cylinder and prevents the escape of air past it. Pushing in on the knob 28 and rod 27 has no effect on the operation of the pump as the rod is free to slide through the plunger in this direction. This makes it impossible for excessive pressures to be imposed even in the pump barrel by pushing in on the knob 28.

Flow of air from the pump to the gauge and tube line is controlled by the triple-function valve in the capsule 36. With the pump in its normal inoperative position with the plunger at the end of its stroke, the spring 30 acting through the plunger 23 holds the valve 42 at the end of its stroke with the valve pin 44 closing the small hole 39 and thereby sealing the connection between pump and gauge. As the knob 28 is pulled out in starting to operate the pump the plunger 23 is pulled away from the valve 42 and the spring 41 forces the valve 42 to the other end of its stroke, opening hole 39 and closing the hole in ring 43, thus sealing the connection between pump and gauge on the outward stroke of the pump.

When the knob 28 is released the plunger starts back under the influence of spring 30. This compresses the air in the pump barrel 21 and forces open the valve 42 against the spring 41. Air therefore flows through the hole in ring 43, through the cut-out portions of the disks 45, through the hole 39, through the radial hole 40, around the cylindrical extension 38 of the capsule 36 and into the tube lines 34 and 52.

The rate at which air reaches the tube lines is controlled by the action of the valve 42. If the pressure in the barrel 21 is higher than desired for the particular apparatus, the valve pin 44 is forced into hole 39 by the force of the air on the end of valve 42 and on disks 45. Spring 41, however, exerts sufficient pressure to prevent the complete closing of hole 39, with the resultant regulation of the rate of flow of the air into the tube system.

As spring 30 is relatively strong so that it may have sufficient power to operate the plunger 23, it holds valve pin 44 very tightly in the hole 39 and therefore effects a positive seal between the tube 34 and the pump 20.

I have thus provided an improved hydrostatic gauge system whereby the level of liquid may be continuously and correctly indicated, with improved means for replenishing the air supply in such systems, improved means for preventing such replenishment being accompanied by excessive pressures, and improved means for effecting a seal between the gauge system and the air replenishing means.

Having thus disclosed and described my invention and explained its purpose, what I claim as new and desire to protect by Letters Patent is:

1. A liquid-level indicating system comprising in combination: a pressure-responsive indicating device, pressure-conveying means subjecting said device to the pressure-head of the liquid whose level is to be indicated, spring operated means for injecting air into said pressure-conveying means, a manually operable device to adjust said air-injecting means for operation by its spring, and means regulating the flow of air into said pressure-conveying means comprising a valve chamber, a valve member reciprocably contained in said chamber and adapted, when in one extreme position, to close said valve chamber to the admission of air thereto from the air-injector means and when in the other extreme position to close the chamber to prevent flow of air between the chamber and the pressure-conveying means, resilient means for holding said valve member in the first named position, said resilient means adapted to be overcome by pressure due to the engagement of the air-injector means with the valve member which pressure is sufficient to hold said valve member in the other of said extreme positions when said manually operable device is not being operated.

2. A liquid-level indicating system comprising in combination: a pressure-responsive indicating device, pressure-conveying means subjecting said device to the pressure-head of the liquid whose level is to be indicated, spring operated means for injecting air into said pressure-conveying means, a manually operable device to adjust said air-injecting means for operation by its spring, and means regulating the flow of air into said pressure-conveying means comprising a valve chamber, a valve member reciprocably contained in said chamber, and adapted, when in one extreme position, to close said valve chamber to the admission of air thereto from the air-injector means and when in the other extreme position to close the chamber to prevent flow of air between the chamber and the pressure-conveying means, said valve member having two valve closing surfaces and a guide portion located between said surfaces, and a resilient member arranged to press against one end of said valve chamber and against said guide portion.

3. A liquid-level indicating system comprising in combination: a pressure-responsive indicating device, pressure-conveying means subjecting said device to the pressure-head of the liquid whose level is to be indicated, spring operated means for injecting air into said pressure-conveying means, a manually operable device to adjust said air-injecting means for operation by its spring, and means regulating the flow of air into said pressure conveying means comprising a valve chamber, a valve member reciprocably contained within said chamber and having a guide portion slidable in said chamber, said guide portion having an air passage permitting flow of air through said chamber past said guide, and a resilient member pressing on said valve member to cause said valve member to tend to move axially.

4. A liquid-level indicating system comprising in combination: a pressure-responsive indicating device, pressure-conveying means subjecting said device to the pressure-head of the liquid whose level is to be indicated, means for injecting air into said pressure-conveying means, and said injecting means comprising a casing containing a manually operable member, a resilient member and a piston member, said manually operable member having provision for compressing said resilient member and the expansion of said resilient member operating said piston member for the injection of air thereby, said piston and manually operable member being cooperatively arranged to prevent action of the manually operable member causing an air injection action by said pump.

5. A liquid-level indicating system comprising in combination: a pressure-responsive indicating device, pressure-conveying means subjecting said device to the pressure-head of the liquid whose level is to be indicated, means for injecting air into said pressure-conveying means, and said injecting means comprising a casing containing a manually operable rod, a spring member, and a piston cooperatively connected to said rod and spring member so as to be movable in only one direction by the movement of said rod and movable in the other direction under the pressure of said spring member.

6. A liquid-level indicating system comprising in combination: a pressure-responsive indicating device, a pressure-conveying connection subjecting said device to the pressure-head of the liquid whose level is to be indicated, means for injecting air into said connection, said means comprising a barrel containing a manually operable member, a resilient member and a reciprocable piston member, said piston member cooperatively connected to said manually operable member and to said resilient member to be movable in only one direction by said manually operable member and to be movable in the other direction by the force of said resilient member, and means regulating the flow of air into said connection, said means comprising a valve chamber, a valve member reciprocally contained in said chamber and having a guide portion slidable in said chamber, said guide portion having an air passage permitting flow of air through said chamber past said guide, said valve member having two valve closing surfaces, a resilient member arranged to normally hold said valve member with one of said closing surfaces in valve closing position and said first named resilient member and piston member arranged to overcome said second named resilient member and hold said valve member with the other of said closing surfaces in valve closing position when said first named resilient member is in its fully expanded position.

7. A liquid-level indicating system comprising in combination: a pressure-responsive indicating device, pressure-conveying means subjecting said device to the pressure-head of the liquid whose level is to be indicated, and means for injecting air into said pressure-conveying means, said injecting means comprising an energy-storing means, manually operable means for actuating said energy-storing means, means operated by said energy-storing means but not by said manually operable means for building up air pressure, means for transmitting air under pressure from said third mentioned means, and pressure-responsive means for controlling the transmission of air by said transmission means.

8. A liquid-level indicating system comprising in combination: a pressure-responsive indicating device, pressure-conveying means subjecting said device to the pressure-head of the liquid whose level is to be indicated, and means for injecting air into said pressure-conveying means, said injecting means comprising a pump including a piston, a manually operable device for moving said piston in one direction but inoperable to move said piston in the opposite direction, and resilient means compressed by movement of said manually operable device for moving said piston in a direction opposite to said first named direction.

9. A liquid-level indicating system comprising in combination: a pressure-responsive indicating device, pressure-conveying means subjecting said device to the pressure-head of the liquid whose level is to be indicated, means for injecting air into said pressure-conveying means, said air injecting means including a piston and a spring, said spring adapted to press upon and move said piston for injection of air, and means to prevent flow of air from said pressure conveying means to said pressure injecting means when the latter means is not being operated, said flow preventing means comprising a valve adapted to be held closed by the pressure of the aforesaid spring when said piston is at the end of its air injecting movement.

10. A liquid-level indicating system comprising in combination: a pressure-responsive indicating device, pressure-conveying means subjecting said device to the pressure-head of the liquid whose level is to be indicated, means for injecting air into said pressure-conveying means, said air injecting means including a piston, a manually operable device for moving said piston in one direction but inoperable to move said piston in the opposite direction, and resilient means compressed by movement of said manually operable device for moving said piston in a direction opposite to said first named direction; and means to prevent flow of air from said pressure conveying means to said air injecting means, said flow preventing means including a valve adapted to be held closed by the pressure of said resilient means when said piston is moved to its extreme position in the above second named direction.

11. A liquid-level indicating system comprising in combination: a pressure-responsive indicating device, pressure-conveying means subjecting said device to the pressure-head of the liquid whose level is to be indicated, means for injecting air into said pressure-conveying means, said air injection means including a piston and a spring, said spring adapted to press upon and move said piston for injection of air, means preventing flow of air from said pressure-conveying means to said air injection means when said piston is at the end of its air injecting movement, said flow preventing means including a valve adapted to be held closed by said spring-pressed piston.

Signed at Brooklyn, in the county of Kings and State of New York, this 20th day of October A. D. 1924.

MORRIS M. TITTERINGTON.